(12) United States Patent
Krutsch et al.

(10) Patent No.: US 12,554,006 B2
(45) Date of Patent: Feb. 17, 2026

(54) RADAR DATA SIGNAL COMPRESSION TECHNIQUES

(71) Applicant: NXP B.V., Eindhoven (NL)

(72) Inventors: Robert Cristian Krutsch, Haar (DE); Martin Kessel, Bannewitz (DE); Mark Steigemann, Ebstorf (DE)

(73) Assignee: NXP B.V., Eindhoven (NL)

( * ) Notice: Subject to any disclaimer, the term of this patent is extended or adjusted under 35 U.S.C. 154(b) by 528 days.

(21) Appl. No.: 18/153,211

(22) Filed: Jan. 11, 2023

(65) Prior Publication Data

US 2024/0230882 A1 Jul. 11, 2024

(51) Int. Cl.
| | | |
|---|---|---|
| *G01S 13/78* | (2006.01) | |
| *H03M 7/30* | (2006.01) | |
| *H04L 27/20* | (2006.01) | |

(52) U.S. Cl.
CPC ............ *G01S 13/788* (2013.01); *H04L 27/20* (2013.01); *H03M 7/30* (2013.01)

(58) Field of Classification Search
CPC ...... G01S 13/42; G01S 13/788; G01S 13/931; H03M 7/30; H04L 27/20
See application file for complete search history.

(56) References Cited

U.S. PATENT DOCUMENTS

| | | | | |
|---|---|---|---|---|
| 7,423,577 | B1 * | 9/2008 | McIntire | G01S 7/006 |
| | | | | 375/295 |
| 10,627,505 | B2 * | 4/2020 | Janssen | G01S 7/4008 |
| 10,812,154 | B1 * | 10/2020 | Elad | G01S 13/42 |
| 11,802,958 | B2 * | 10/2023 | Levitan | G01S 13/42 |
| 2019/0293755 | A1 * | 9/2019 | Cohen | G01S 7/295 |
| 2020/0309933 | A1 * | 10/2020 | Ray | G01S 13/282 |
| 2020/0309939 | A1 * | 10/2020 | Subburaj | G01S 13/584 |
| 2021/0173042 | A1 * | 6/2021 | Wu | G01S 7/356 |
| 2021/0293926 | A1 * | 9/2021 | Elad | G01S 7/285 |
| 2022/0099837 | A1 * | 3/2022 | Crouch | G01S 13/931 |
| 2022/0196795 | A1 * | 6/2022 | Wu | G01S 7/354 |
| 2023/0026761 | A1 * | 1/2023 | Gianelli | G01S 7/003 |
| 2023/0262485 | A1 * | 8/2023 | Annavajjala | G01S 7/02 |
| | | | | 370/328 |

FOREIGN PATENT DOCUMENTS

| | | |
|---|---|---|
| DE | 102018219841 A1 | 5/2020 |
| EP | 3179266 B1 | 2/2019 |

OTHER PUBLICATIONS

Johnson et al, "Code-Domain Multiplexing for Shared IF/LO Interfaces in Millimeter-Wave MIMO Arrays", IEEE Journal of Solid-State Circuits, IEEE, Feb. 13, 2020, pp. 1270-1281, vol. 55, No. 5.

(Continued)

*Primary Examiner* — Peter M Bythrow

(57) ABSTRACT

The present disclosure provides a radar front end chip that includes a plurality of encoders, each encoder of the plurality of encoders to receive a digitized radar signal and to encode the digitized radar signal with a phase code to generate one of a plurality of phase-coded digitized radar signals. The radar front end chip also includes a combiner to combine the plurality of phase-coded digitized radar signals into a digital radar data stream for transmission to a central radar processor.

20 Claims, 5 Drawing Sheets

(56) References Cited

OTHER PUBLICATIONS

Mani, Anil et al., "Memory Compression and Decompression Engine for TI mmWave Radar", Texas Instruments, Application Report, SWRA663; Dec. 2019; 10 pages.
Takayama, Takuya et al., "MIMO Imaging Radar with Enhanced Range-Azimuth Sidelobe Suppression", IEEE IET International Conference on Radar Systems; Oct. 22-25, 2012; 4 pages.
Wikipedia, "Code-Division Multiple Access", downloaded from <<https://en.wikipedia.org/wiki/Code-division_multiple_access>> on Oct. 10, 2022; 11 pages.
Wikipedia, "Huffman Coding", downloaded from <<https://en.wikipedia.org/wiki/Huffman_coding>> on Oct. 10, 2022; 11 pages.
Zhao, Zhiguo et al., "Slow Time Random Phase-Coded Waveforms in MIMO OTHR", IEEE International Symposium on Antennas, Propagation and EM Theory; Oct. 22-26, 2012; 4 pages.

\* cited by examiner

RADAR DATA SIGNAL COMPRESSION TECHNIQUES

BACKGROUND

Radar is used to detect the range to and velocity of objects and can support a wide variety of applications. For example, radar systems are sometimes employed in automobiles to assist in cruise control, collision warning, blind spot detection, lane change assist, parking assist, rear collision warning, and other driver assistance or autonomous driving functions. In these automobile applications, a radar system typically includes a plurality of radar sensors with radar front end chips. The radar sensors are located at different areas of the automobile and collect radar data for transmission to a central radar processor. The radar sensors operate by transmitting a sequence of equally spaced chirps in a radar signal generated by the radar front end chip. The reflections of these transmitted radar signals are then received by the radar sensor, and the radar front end chip processes these received signals into digital signals for transmitting to the central radar processor for higher level processing to provide radar information, such as the range to and the velocity of nearby objects, to use in driver assistance or autonomous driving functions.

SUMMARY

Various example embodiments are directed to compression schemes that can be used to reduce the size of a radar data stream from a radar sensor to a central radar processor.

In one example embodiment, a radar front end chip includes a plurality of encoders, each encoder of the plurality of encoders to receive a digitized radar signal and to encode the digitized radar signal with a phase code to generate one of a plurality of phase-coded digitized radar signals, and a combiner to combine the plurality of phase-coded digitized radar signals into a digital radar data stream for transmission.

In some embodiments, the radar front end chip includes compression and encoding circuitry to further compress the digital radar data stream prior to transmission over a high bandwidth interface to a central radar processor. In some embodiments, the compression and encoding circuitry includes block-based compression circuitry. In some embodiments, the phase codes applied by the plurality of encoders are orthogonal to one another. In some implementations, each of the plurality of encoders is a binary phase-shift keying modulator or similar type modulator. In some embodiments, the radar front end chip is configured to generate radar signals for transmission based on chirp sequences, and the radar front end chip further includes a plurality of phase shifters corresponding to a plurality of transmission antennas coupled to the radar front end chip. In some embodiments, the radar front end chip includes a plurality of analog-to-digital converters (ADCs), each ADC of the plurality of ADCs configured to generate a corresponding digitized radar signal received by each encoder of the plurality of encoders. In some embodiments, the radar front end chip is configured to implement a multiple-input multiple-output (MIMO) radar configuration via the plurality of transmission antennas and a plurality of reception antennas coupled to the radar front end chip. In these cases, the radar front end chip includes a plurality of chains of reception components, each chain of the plurality of chains of reception components coupled between a respective subset of reception antennas of the plurality of reception antennas and one of the plurality of ADCs. The plurality of chains of reception components may include, for example, one or more of a low noise amplifier, a mixer, a high pass filter, a gain amplifier, or a low pass filter. In some embodiments, the radar front end chip also includes an interface port to support the high bandwidth interface with the central radar processor.

In another example embodiment, a radar system includes a central radar processor and a plurality of radar sensors. Each radar sensor of the plurality of radar sensors includes a plurality of reception antennas, a plurality of transmission antennas, and a radar front end chip. The radar front end chip in each of the radar sensors includes a plurality of encoders, each encoder of the plurality of encoders to receive a digitized radar signal and to encode the digitized radar signal with a phase code to generate one of a plurality of phase-coded digitized radar signals and a combiner to combine the plurality of phase-coded digitized radar signals into a digital radar data stream for transmission.

In some embodiments, the radar system includes one or more high bandwidth interfaces coupling the central radar processor to the plurality of radar sensors. In some embodiments, the radar front end chip in the radar system includes compression and encoding circuitry to further compress the digital radar data stream prior to transmission over the high bandwidth interface to a central radar processor. In some embodiments of the radar system, the phase codes applied by the plurality of encoders are orthogonal to one another. In some embodiments of the radar system, the radar front end chip further includes a plurality of analog-to-digital converters (ADCs), where each ADC of the plurality of ADCs is configured to generate a corresponding digitized radar signal received by each encoder of the plurality of encoders. In some embodiments of the radar system, the radar front end chip further includes a plurality of chains of reception components. In these cases, each chain of the plurality of chains of reception components is coupled between a respective subset of reception antennas of the plurality of reception antennas and one of the plurality of ADCs.

In another example embodiment, a method includes receiving, at each of a plurality of encoders, a digitized radar signal from a corresponding one of a plurality of analog-to-digital converters (ADCs); encoding, at each of the plurality of encoders, the corresponding digitized radar signal with a phase code to generate one of a plurality of phase-coded digitized radar signals; and combining, at a combiner, the plurality of phase-coded digitized radar signals into a digital radar data stream for transmission.

In some embodiments of the method, the method includes compressing, at a compression and encoding circuitry, the digital radar data stream prior to transmission to a central radar processor. In some embodiments of the method, the phase codes applied by the plurality of encoders are orthogonal to one another. In some embodiments of the method, the method includes receiving a plurality of radar signals at a plurality of reception antennas based on reflections from radar signals transmitted from a plurality of transmission antennas associated with the plurality of reception antennas and converting the plurality of radar signals to a plurality of digitized radar signals at the plurality of ADCs.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
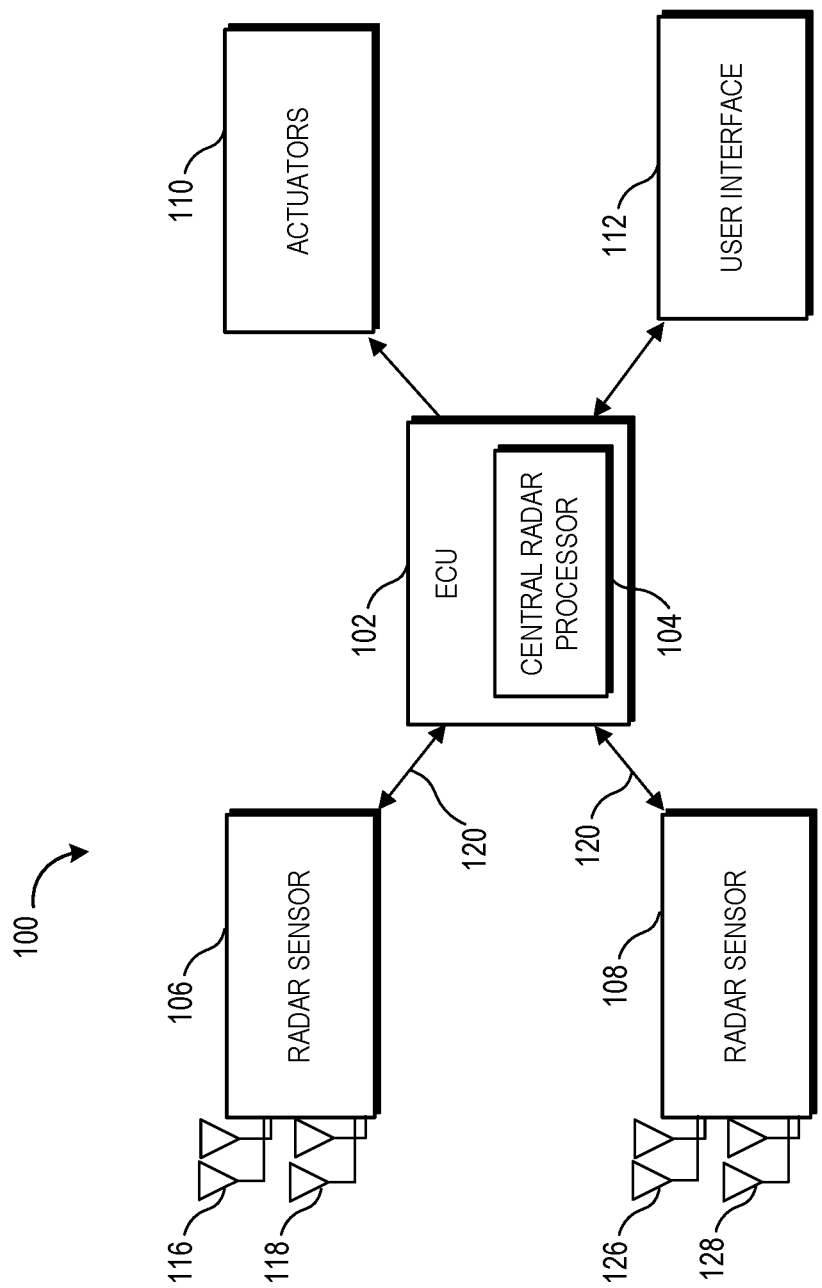
FIG. 1 is a diagram of a vehicular control system implementing a radar system including a plurality of radar sensors and a central radar processor in accordance with some embodiments.

Advances in radar technology, such as the development of multiple-input and multiple-out (MIMO) radar, have led to its implementation in driver-assistance and autonomous driving systems that rely on high resolution and near real-time processing capabilities. This increase in radar data resolution coupled with the need for faster processing times has resulted in higher bandwidth signaling between the radar sensors and the central radar processor. High bandwidth interfaces are typically used to accommodate the requirements for increased data loads transmitted between radar sensors and the central radar processor. However, these high-bandwidth interfaces are expensive, and, in some vehicular application scenarios, they may not be sufficient to support the required levels of bandwidth. Moreover, from the radar sensor perspective, the higher quantities of radar data generated by MIMO radar systems are computationally intensive to process and taxing on the limited embedded memory resources available to the radar front end. Accordingly, any reduction in the radar data communication bandwidth between the radar sensors and the central radar processor is beneficial. FIGS. 1-6 provide techniques to compress radar data based on code division multiplexing (CDM) and signal combining which reduces the size of the radar data stream, and thereby the bandwidth, between the radar sensors and the central radar processor. This reduction in bandwidth between each of the radar sensors and the central radar processor improves the overall efficiency of the radar system.

To illustrate, a radar sensor includes plurality of antennas and a radar front end chip that includes a transceiver and a digital signal processor (DSP). The transceiver includes transmission components to generate radar signals based on radar chirp sequences and to transmit the radar signals via the radar sensor's transmission antennas. In some cases, the radar signals are transmitted from the transmission antennas based on a MIMO radar configuration. The radar sensor also includes a plurality of reception antennas that are arranged in subsets (which may include one or more reception antennas) to receive the reflected radar signals. Each subset of the plurality of reception antennas, therefore, provides one of a plurality of received radar data streams. The transceiver in the radar front end chip includes a chain of reception components coupled to each of the plurality of reception antennas. The reception components include signal processing components, such as amplifiers, mixers, and filters, that downconvert the plurality of received radar data streams. Once the plurality of received data streams are downconverted, they are each fed to a one of a plurality of corresponding analog-to-digital converter (ADC) in the transceiver for digitization. The plurality of digitized radar data streams is then forwarded to the DSP of the radar front end chip. The DSP includes a plurality of code division multiplexers that modulate each of the plurality of digitized radar data streams with a unique coding pattern to generate a plurality of digitally encoded radar data streams. The DSP further includes a combiner that combines the plurality of digitally encoded radar data streams into a single radar data stream for transmission to a central radar processor over an interface. In some embodiments, the DSP includes additional compression circuitry such as Huffman block-based compression components to further compress the single radar data stream prior to transmission to the central radar processor. In any event, the radar data stream communicated from the radar sensor to the central radar processor is compressed, thereby alleviating the data bandwidth communicated over the interface between the radar sensor and the central radar processor.

The central radar processor, in some embodiments, may be located in an automobile's electronic control unit (ECU) or other host processor that controls a wide variety of automotive actuators (e.g., steering, braking, and throttling actuators). In addition, the ECU or other host processor is configured to display information (e.g., warnings of nearby objects) via a user interface of the automobile. The central radar processor includes decompression components and decoders to separate the single radar data stream received from the radar sensor into a plurality of radar data streams corresponding with those initially received by the radar sensor for estimating the range and velocities of objects in surrounding area.

FIG. 1 illustrates a vehicular control system 100 in accordance with some embodiments. The vehicular control system 100 may be implemented, for example, in an automobile and may be used to assist in driver-related or autonomous driving functions. It is appreciated that vehicular control system 100 is simplified for purposes of this explanation and may include additional components associated with the operation of an automobile. In some embodiments, the vehicular control system 100 includes a radar system including radar sensors 106, 108 and a central radar processor 104.

The vehicular control system includes an electronic control unit (ECU) 102. In some embodiments, the ECU 102 includes the central radar processor 104 as well as other processing circuitry, e.g., a central processing unit (CPU), to perform various processing functions related to vehicular control. The central radar processor 104 is coupled to radar sensors 106, 108 via interfaces 120. While two radar sensors 106, 108, are shown in FIG. 1, it is appreciated that this number is for clarity purposes and may be scalable to a larger quantity. In some embodiments, the radar sensors 106, 108 are located at different positions of an automobile housing vehicular control system 100. For example, one radar sensor 106 may be at the front end of the automobile and the other radar sensor 108 may be at the rear end of the automobile. In some embodiments, radar sensor 106 includes a plurality of antennas 116, 118. For example, plurality of antennas 116 are transmission antennas and plurality of antennas 118 are reception antennas. Similarly, in some embodiments for radar sensor 108, plurality of antennas 126 are transmission antennas and plurality of antennas 128 are reception antennas. In some embodiments, the plurality of antennas associated with each of radar sensors 106, 108 support MIMO radar configurations. It is appreciated that while two antennas are shown for each of the plurality of antennas 116, 118, 126, 128, this is for clarity purposes and may be scalable to larger quantities (e.g., three, four, or more antennas).

In some embodiments, the central radar processor 104 is implemented as a micro-controller unit (MCU) or other processing unit that is configured and arranged for radar signal processing tasks such as, but not limited to, object identification, computation of object distance, object velocity, and object direction (collectively referred to as "radar information"). In some embodiments, central radar processor 104 is additionally configured to generate control signals based on the radar information. The radar controller processor 104 may for example, be configured to generate calibration signals, receive data signals, receive sensor signals, generate frequency spectrum shaping signals (such as ramp generation in the case of frequency modulation continuous wave (FMCW) radar) and/or state machine signals for radio frequency (RF) circuit enablement sequences. In addition, the radar controller processor 104 may be configured to program the radar sensors 106, 108 to operate in a coordinated fashion by transmitting MIMO waveforms for use in constructing a virtual aperture from a combination of the distributed apertures formed by the plurality of transmission and reception antennas shown in FIG. 1.

Each of the radar sensors 106, 108 includes a radar front end chip which is coupled to the respective pluralities of antennas to transmit radar signals (e.g., in the form of radar chirp sequences), to receive reflected radar signals, and to digitize these received radar signals for forwarding to the central radar processor 104 over interface 120. The radar control processor 104 then performs radar processing tasks based on the digitized radar signals received from the radar front end chips in the radar sensors 106, 108 to provide radar information to the ECU 102. The ECU 102 can then use this radar information to control one or more actuators 110 such as a steering actuator, braking actuator, or throttle actuator to assist in driver-assistance or autonomous driving functions. In some embodiments, the ECU 102 displays the radar information or associated information via a user interface 112 such as a screen display, a speaker, or a light (e.g., in a side mirror or on a dashboard) to alert the driver of nearby objects.

In some embodiments, each of the radar front end chips in the radar sensors 106, 108, is equipped with an interface port to communicate with the radar controller processor 104 over interface 120. In some cases, the interface 120 may support high-bandwidth data communication (e.g., 100 megabits (Mb) per second (Mbps) or 1 gigabit (Gb) per second (Gbps)). However, these higher-bandwidth interfaces can increase the overall cost of the vehicular control system 100. Additionally, in some situations, the data bandwidth communicated over interface 120 may be extremely high, e.g., in excess of what the interface 120 may be configured to support. To account for these factors, and in accordance with the techniques presented herein, the radar front end chips in the radar sensors 106, 108 are configured to compress and combine the plurality of radar data streams received via the plurality reception antennas 118, 128, respectively, prior to transmission over interface 120 to the radar controller processor 104.

Figure 2:
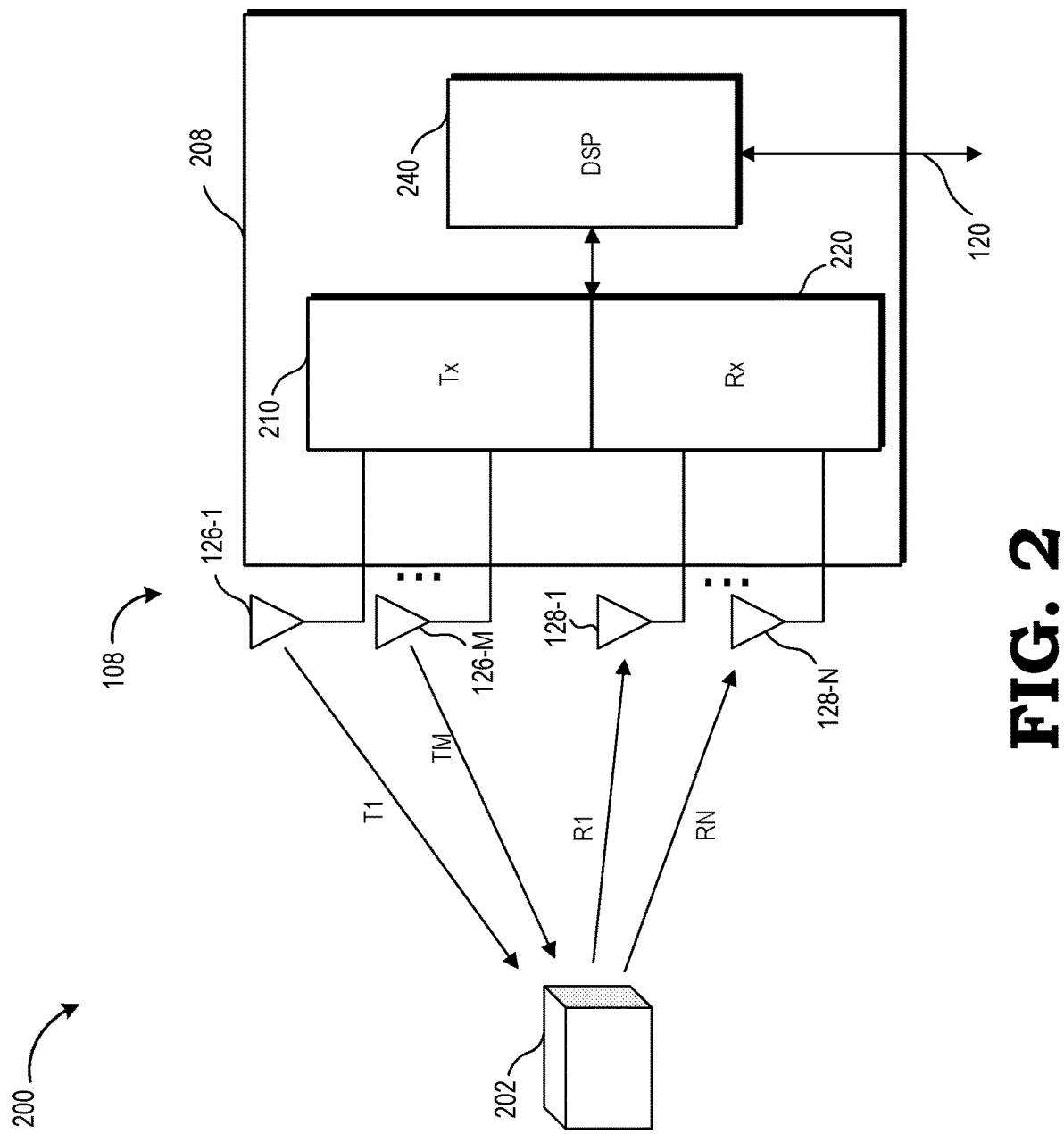
FIG. 2 is a diagram of a radar sensor as shown in FIG. 1 in accordance with some embodiments.

FIG. 2 illustrates diagram 200 of a radar sensor, e.g., radar sensor 106 or 108, operating with a MIMO configuration in accordance with some embodiments. Although diagram 200 refers to radar sensor 108, it is appreciated that the ensuing explanation also applies to radar sensor 106 or another radar sensor in a vehicular control system such as vehicular control system 100.

In some embodiments, radar sensor 108 includes a radar front end chip 208 that includes radar transceiver circuitry (the combination of transmission (TX) circuitry 210 and reception (RX) circuitry 220) and a digital signal processor (DSP) 240. The radar transceiver includes TX circuitry 210 with transmission components configured to transmit radar signals (e.g., based on equally spaced out radar chirp sequences in sequential frames) via transmission antennas 126-1 to 126-M. While two transmission antennas 126-1 and 126-M are shown (i.e., M=2), it is appreciated that this number may be scalable to higher quantities based on the MIMO configuration to be implemented by the radar sensor 108. As shown, transmission antenna 126-1 transmits radar signal T1 and transmission antenna 126-M transmits radar signal TM. In some embodiments, radar signals T1 and TM are transmitted concurrently. In some embodiments, radar signals T1 and TM each include a series of chirps that are transmitted in sequence over a plurality of frames. For example, according to some radar schemes, the chirp sequences may include 512 chirps transmitted over 15 milliseconds (ms) in a 50 ms frame.

The radar signals T1 and TM may reflect off one or more objects such as object 202 and back in the direction of reception antennas 128-1 and 128-N as reflected radar signals R1 and RN. Reflected radar signal R1 may include components corresponding to the reflections of T1 and TM that are received at reception antenna 128-1 and reflected radar signal RM may include components corresponding to the reflections of T1 and TM received at reception antenna 128-M. While two reception antennas 128-1 and 128-M are shown (i.e., M=2), it is appreciated that this number may be scalable to higher quantities based on the MIMO scheme to be implemented by the radar sensor 108. After receiving reflected radar signals R1 and RM at reception antennas 128-1 and 128-M, respectively, the received radar signals are forwarded to RX circuitry 220 for further signal processing. In some embodiments, the RX circuitry 220 includes a plurality of receive chains corresponding to the number of reception antennas 128-1 and 128-M. Each of these receive chains perform signal conditioning and mixing operations (e.g., amplification, filtering) on the received radar signals prior to digitizing the radar signals to pass to the DSP 240. The DSP 240 includes code division multiplexing (CDM) components to modulate each of the plurality of digitized radar signals based on a coding pattern. For example, the unique coding patterns may be based on a Gold code or similar type of coding scheme that implements unique coding patterns for each of the digitized radar signals. In some embodiments, these unique coding patterns are orthogonal to one another. Thereafter, the DSP 240 combines all of the now-digitally encoded plurality of radar signals into a single data stream for transmission over interface 120. In this manner, the radar front end chip 208 of the radar sensor 108 implements a compression scheme that reduces the size of the radar data sent over interface 120, thereby reducing the bandwidth needs of the overall system.

Figure 3:
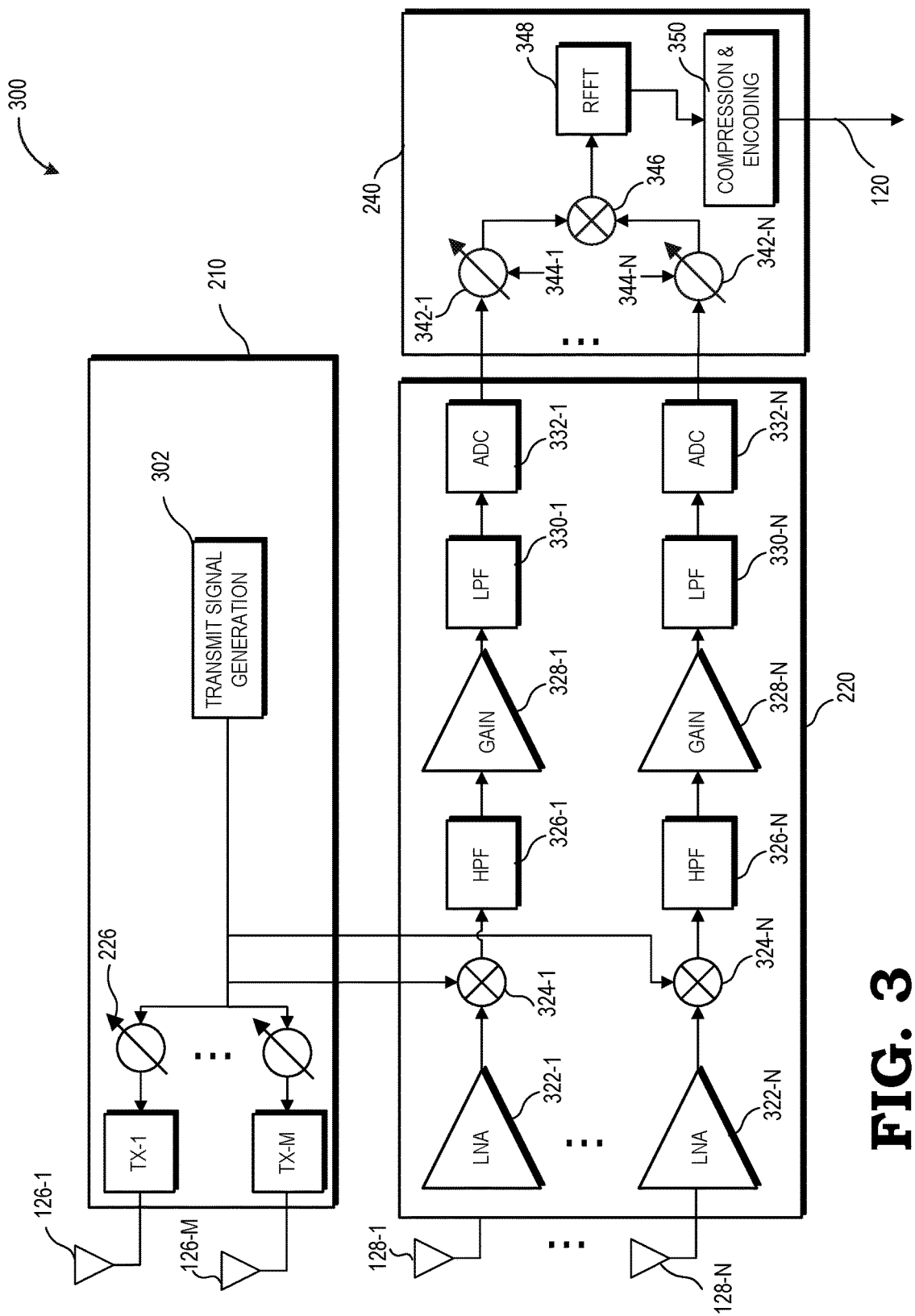
FIG. 3 is a diagram of a radar front end chip of the radar sensor shown in FIG. 2 that is configured to reduce the data bandwidth communicated from the radar sensor to the central radar processor in accordance with some embodiments.

FIG. 3 illustrates a diagram of a radar front end chip 300 to use in a radar sensor such as radar sensors 106, 108.

Although not shown in FIG. 3, front end chip 300 may also include additional components such as an embedded memory (e.g., Static Random Access Memory (SRAM). In some embodiments, radar front end chip 300 corresponds to radar front end chip 208 in FIG. 2.

The front end chip 300 includes TX circuitry 210 such as that corresponding to TX circuitry 210 in FIG. 2. The TX circuitry 210 includes, among other components, transmit signal generation circuitry 302 to generate a carrier signal within a programmable frequency band with a programmable chirp rate and range. For example, a radar chirp sequence may be generated based on a local oscillator (LO) input and a chirp start trigger input. In some embodiments, the chirp start trigger input is provided by the central radar processor 104 (not shown in FIG. 3). Splitters (not shown) and phase shifters such as 226 enable the multiple transmitters, TX1 through TXM, to operate concurrently. In the illustrated example, the RF front end chip includes two transmitters (TX-1 through TX-M) each of which is coupled to a corresponding transmit antenna 126-1 and 126-M. In alternative examples, multiple transmit antennas are coupled to each of the transmitters, TX-1 and TX-M. In some embodiments, TX circuitry 210 includes other signal processing components such as digital-to-analog (DAC) converters, buffers, mixers, filters, or power amplifiers. For example, the power amplifiers are included to amplify the signal to a level suitable for transmission as a radar signal from transmission antennas 126-1 to 126-M.

In some embodiments, the radar front end chip 300 also includes RX circuitry 220 such as that corresponding to RX circuitry 220 in FIG. 2. In some embodiments, the RX circuitry 220 includes multiple RX chains corresponding to each of the reception antennas 128-1 to 128-N. For example, with respect to reception antenna 128-1, the RX circuitry 220 includes an RX chain including low noise amplifier 322-1 to amplify the radar signal received at reception antenna 128-1 and mixer 324-1 to mix the amplified signal with signal generated by the transmit signal generation circuitry 302 to generate an intermediate frequency (IF) signal. The resulting IF signal is then fed to a high-pass filter (HPF) 326-1 to remove unwanted lower frequencies from the signal and then to a gain amplifier 328-1 which amplifies the IF signal before forwarding it to a low-pass filter (LPF) 330-1 to remove noise. The re-filtered signal is then fed to an analog-to-digital converter (ADC) 332-1 to generate a digital signal for outputting to the DSP 240. The RX circuitry 210 includes similar RX chains including one or more of LNA 322-N, mixer 324-N, HPF 326-N, gain amplifier 328-N, LPF 330-N, and/or ADC 332-N for the other reception antennas 128-N.

After the plurality of radar signals received at the reception antennas 128-1 to 128-N undergo signal processing by the RX chains in the RX circuitry 220 and are digitized by each of the respective ADCs 332-1 to 332-N, the digitized plurality of radar signals is forwarded to the DSP 240 for further processing. At the DSP 240, each output from an ADC 332-1 to 332-N is fed to a unique code division multiplexer 342-1 to 342-N. Each code division multiplexer 342-1 to 342-N applies a corresponding code 344-1 to 344-N to the digitized radar data stream it receives. For example, code division multiplexer 342-1 applies a code 344-1 to the digitized radar data stream received from ADC 332-1, and code division multiplexer 342-N applies a phase code 344-N to the digitized radar data stream received from ADC 332-N. In some embodiments, each of the phase codes 344-1 to 344-N are unique phase codes that are orthogonal or substantially orthogonal to one another. For example, in some embodiments the phase codes 344-1 to 344-N are Gold codes similar to those used in Code-Division Multiple Access (CDMA) technologies. In some embodiments, the phase codes 344-1 to 344-N are generated by the DSP 240. In other embodiments, the phase codes are generated by another processor or controller, such as by the central radar processor 104 or by the ECU 102 shown in FIG. 1, and communicated to the DSP 240. After being encoded by code division multiplexers 342-1 to 342-N, the encoded data streams are fed to a combiner 346 which combines the encoded digital radar data streams into a digital radar data stream.

In some embodiments, the code division multiplexers 342-1 to 342-N are phase modulators. For example, each of the phase modulators may be a binary phase-shift keying modulator that applies a unique binary phase code to the digitized radar data stream.

In some embodiments, the single digital radar data stream from the combiner 346 is subject to additional signal processing before it is transmitted to the central radar processor 104 over interface 120. In some cases, the single data stream is processed by a range Fast Fourier Transform (RFFT) 348. In some cases, the single data stream is also processed by compression and encoding circuitry 350 to further reduce the data bandwidth of the single digital radar data stream. For example, the compression and encoding circuitry 350 further compresses the single digital radar data stream based on Huffman block-based compression (shown in FIG. 4) to eliminate or reduce inter-chirp redundancy in the received radar signals. Accordingly, the digital radar data stream communicated from the radar front end chip 300 in the radar sensor to the central radar processor over interface 120 is compressed, thereby alleviating the data bandwidth between the radar sensor and the central radar processor.

Figure 4:
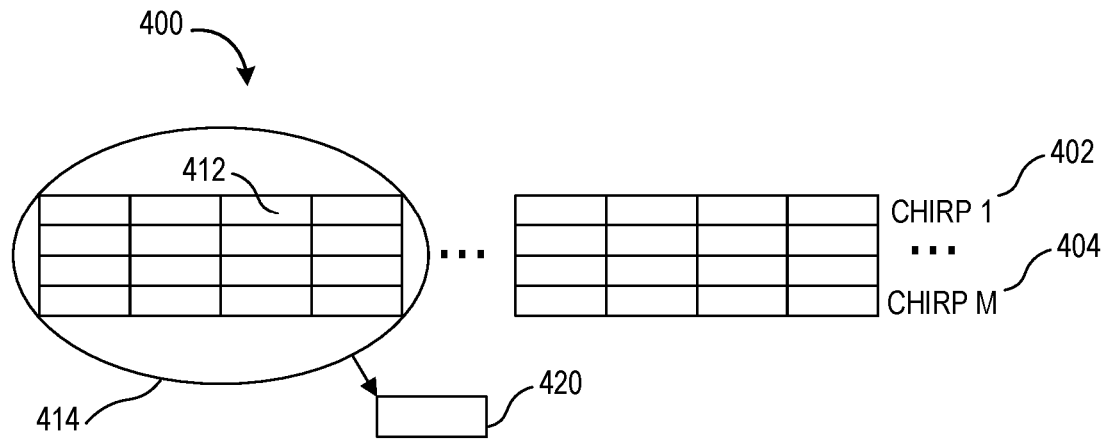
FIG. 4 is a diagram of additional data compression and encoding that is performed by the radar front end chip shown in FIG. 3 in accordance with some embodiments.

FIG. 4 shows a diagram 400 illustrating an example of additional compression that can be implemented by the compression and encoding circuitry 350. In this example, a Huffman block-based compression is shown to reduce inter-chip redundancy. In some embodiments, this compression technique is similar to that used in block-based image and video encoding formats. For example, in diagram 400, radar data associated with Chirp sequence 1 402 to Chirp sequence M 404 is shown. Each block in diagram 400, such as labeled block 412 (only one labeled for clarity purposes), corresponds to a radar data frame for the corresponding chirp sequence. For example, labeled block 412 corresponds to the third radar data frame for Chirp sequence 1. In some embodiments, the compression and encoding circuitry 350 is configured to identify inter-chirp redundancy across several frames and downsample the corresponding frames to further compress the digital radar data stream transmitted from the radar front end chip 300 in the radar sensors 106, 108 to the central radar processor 104. In this example, the compression and encoding circuitry 350 identifies that all of the data blocks outlined by 414 have substantially the same radar data and therefore applies a single data value to describe the data in the 16 identified data blocks outlined by 414. For example, in some aspects, the data blocks outlined by 414 include radar data that corresponds to free space in the nearby surrounding area where no received radar signal is detected, i.e., there is no radar signal reflected back off an object, such as object 202 in FIG. 2. Accordingly, instead of transmitting the radar data provided in the data blocks outlined by 414 as 16 separate data values (one data value per block 412), the compression and encoding circuitry 350 applies compression techniques (such as Huffman block-based compression) to remove the inter-chirp redundancy across the data blocks outlined by 414 and encodes the corresponding representative radar data with fewer data values or as a single representative radar data value 420 that can be applied to the data blocks of data outlined by 414. In some embodiments, the compression and encoding circuitry 350 is configured to compress radar data for radar data block sizes such as 4×4, 8×8, 16×16, or the like.

Figure 5:
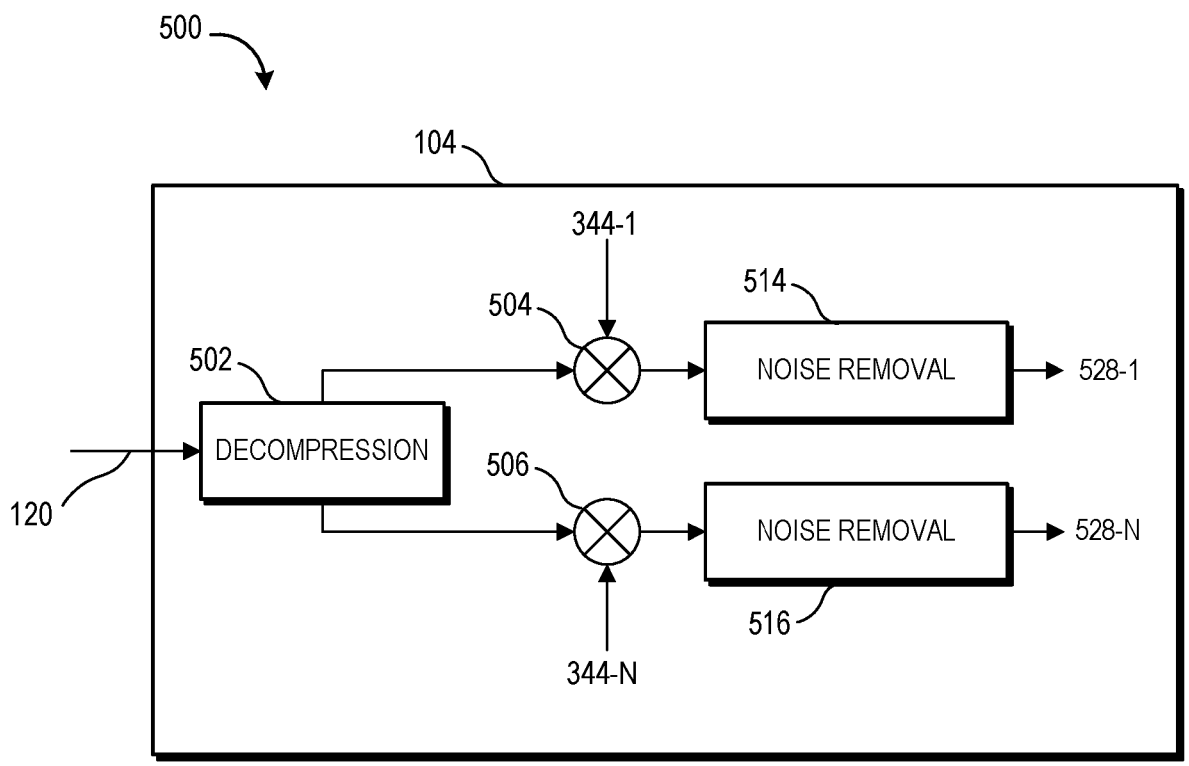
FIG. 5 is a diagram of a central radar processor such as that shown in FIG. 1 in accordance with some embodiments.

FIG. 5 shows a diagram 500 of a central radar process 104 according to some embodiments. It is appreciated that diagram 500 highlights the components of the central radar processor 104 needed for operation with the radar front end 300 described in FIG. 3, and accordingly, other components of the central radar processor 104 are omitted for purposes of clarity. For example, although not shown, in some embodiments the central radar processor 104 includes a radar module including dedicated hardware and/or software components to perform fast-time FFT, slow-time FFT, peak detection, spatial FFT, target tracking, velocity estimation, range estimation, and frequency/phase measurement components to perform functionalities associated with radar data processing. Furthermore, the central radar processor may include an additional interface for communicating radar information to a host processor or ECU such as ECU 102 in FIG. 1.

In some embodiments, the central radar processor 104 includes an interface port to couple to interface 120 to receive the single digital radar data stream from a radar sensor such as radar sensor 108. For example, the interface port may be a high bandwidth interface port or the like. Although only one interface 120 is shown in diagram 500, it is appreciated that additional interfaces and central radar processor 104 components may be included based on the number of radar sensors connected to the central radar processor 104. For purposes of clarity, a single processing component chain in the central radar processor 104 is shown to correspond with the radar front-end chip 300 described in FIG. 3.

The central radar processor 104 includes decompression circuitry 502. In some embodiments, the decompression circuitry 502 includes decoding hardware and/or software to undo the block-based compression performed by the compression and encoding circuitry 350 in the radar front end chip 300, for example. Additionally, the central radar processor 104 include decoders 504, 506 to decode the decompressed data stream from the decompression circuitry 502. For example, decoder 504 uses code 344-1 to recover the digital radar data stream encoded at code division multiplexer 342-1. Similarly, decoder 506 uses code 344-N to recover the digital radar data stream encoded at code division multiplexer 342-N. Accordingly, the output of each of the decoders 504 and 506 corresponds to the digital radar data streams output at the ADCs 332-1 to 332-N in the radar front end chip 300, respectively. The resulting data streams are then fed to noise removal circuitry 514, 516, which may include one or more filters to remove noise from the signals, to produce signals 528-1 to 528-N. In some embodiments, signal 528-1 corresponds to the digital form of the radar signal received at reception antenna 128-1 and signal 528-N corresponds to the digital form of the radar signal received at reception antenna 128-N. Once these signals are recovered, they may be fed to other components of central radar processor 104 to obtain radar information such as velocity or range estimations of detected objects.

Figure 6:
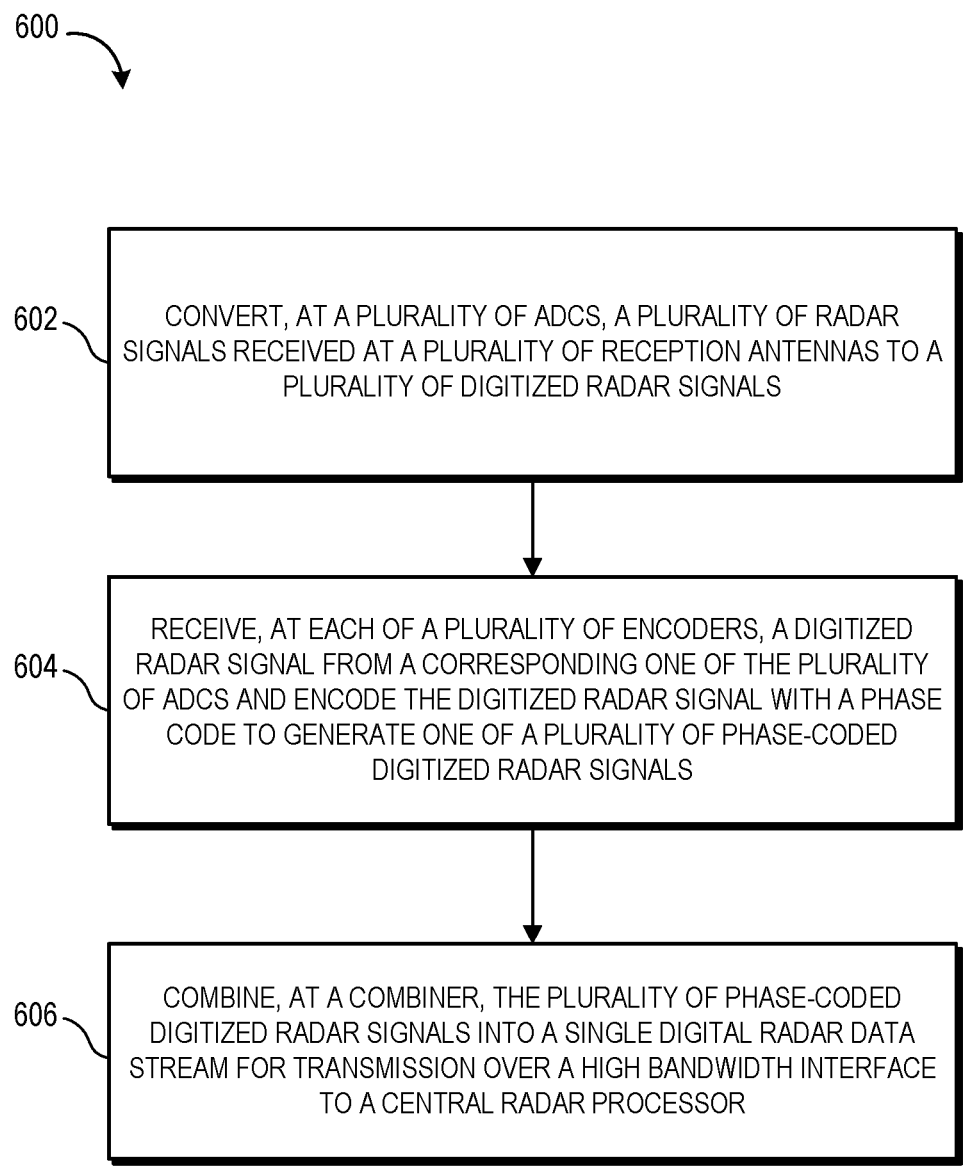
FIG. 6 is a flowchart illustrating a method to implement compression and combining techniques at a radar front end chip in a radar sensor to reduce the data communication bandwidth communicated over an interface coupling the radar sensor with a central radar processor in accordance with some embodiments.

FIG. 6 illustrates a flowchart 600 describing a method according to some embodiments. The method may be used to implement compression and combining techniques at a radar front end chip in a radar sensor to reduce the data communication bandwidth communicated over an interface coupling the radar sensor with a central radar processor.

At 602, the method includes converting, at a plurality of analog-to-digital converters (ADCs), a plurality of radar signals received at a plurality of reception antennas to a plurality of digitized radar signals, each digitized radar signal of the plurality of digitized radar signals corresponding to a subset of the plurality of reception antennas coupled to a radar front end chip. At 604, the method includes receiving, at each of a plurality of encoders, a digitized radar signal from a corresponding one of the plurality of ADCs and encoding the digitized radar signal with a phase code to generate one of a plurality of phase-coded digitized radar signals. At 606, the method includes combining, at a combiner, the plurality of phase-coded digitized radar signals into a single digital radar data stream for transmission over a high bandwidth interface to a central radar processor.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A radar front end chip comprising:
a plurality of encoders, each encoder of the plurality of encoders to receive a digitized radar signal and to encode the digitized radar signal with a phase code to generate one of a plurality of phase-coded digitized radar signals; and
a combiner to combine the plurality of phase-coded digitized radar signals into a digital radar data stream for transmission.

2. The radar front end chip of claim 1, further comprising compression and encoding circuitry to further compress the digital radar data stream prior to transmission over a high bandwidth interface to a central radar processor.

3. The radar front end chip of claim 2, wherein the compression and encoding circuitry comprises block-based compression circuitry.

4. The radar front end chip of claim 1, wherein the phase codes applied by the plurality of encoders are orthogonal to one another.

5. The radar front end chip of claim 1, wherein each of the plurality of encoders is a binary phase-shift keying modulator.

6. The radar front end chip of claim 1, further configured to generate radar signals for transmission based on chirp sequences, the radar front end chip further comprising a plurality of phase shifters corresponding to a plurality of transmission antennas coupled to the radar front end chip.

7. The radar front end chip of claim 6, further comprising a plurality of analog-to-digital converters (ADCs), each ADC of the plurality of ADCs configured to generate a corresponding digitized radar signal received by each encoder of the plurality of encoders.

8. The radar front end chip of claim 7, configured to implement a multiple-input multiple-output (MIMO) radar configuration via the plurality of transmission antennas and a plurality of reception antennas coupled to the radar front end chip.

9. The radar front end chip of claim 8, further comprising a plurality of chains of reception components, each chain of the plurality of chains of reception components coupled between a respective subset of reception antennas of the plurality of reception antennas and one of the plurality of ADCs.

10. The radar front end chip of claim 9, wherein each of the plurality of chains of reception components comprises one or more of a low noise amplifier, a mixer, a high pass filter, a gain amplifier, or a low pass filter.

11. The radar front end chip of claim 2, further comprising an interface port to support the high bandwidth interface with the central radar processor.

12. A radar system comprising:
a central radar processor;
a plurality of radar sensors, each radar sensor of the plurality of radar sensors comprising:
a plurality of reception antennas;
a plurality of transmission antennas; and
a radar front end chip comprising:
a plurality of encoders, each encoder of the plurality of encoders to receive a digitized radar signal and to encode the digitized radar signal with a phase code to generate one of a plurality of phase-coded digitized radar signals; and
a combiner to combine the plurality of phase-coded digitized radar signals into a digital radar data stream for transmission.

13. The radar system of claim 12, further comprising:
a high bandwidth interface,
wherein the radar front end chip comprises compression and encoding circuitry to further compress the digital radar data stream prior to transmission over the high bandwidth interface to a central radar processor.

14. The radar system of claim 12, wherein the phase codes applied by the plurality of encoders are orthogonal to one another.

15. The radar system of claim 12, the radar front end chip further comprising a plurality of analog-to-digital converters (ADCs), each ADC of the plurality of ADCs configured to generate a corresponding digitized radar signal received by each encoder of the plurality of encoders.

16. The radar system of claim 15, the radar front end chip further comprising a plurality of chains of reception components, each chain of the plurality of chains of reception components coupled between a respective subset of reception antennas of the plurality of reception antennas and one of the plurality of ADCs.

17. A method comprising:
receiving, at each of a plurality of encoders, a digitized radar signal from a corresponding one of a plurality of analog-to-digital converters (ADCs);
encoding, at each of the plurality of encoders, the corresponding digitized radar signal with a phase code to generate one of a plurality of phase-coded digitized radar signals; and
combining, at a combiner, the plurality of phase-coded digitized radar signals into a digital radar data stream for transmission.

18. The method of claim 17, further comprising compressing, at a compression and encoding circuitry, the digital radar data stream prior to transmission to a central radar processor.

19. The method of claim 17, wherein the phase codes applied by the plurality of encoders are orthogonal to one another.

20. The method of claim 17, further comprising:
receiving a plurality of radar signals at a plurality of reception antennas based on reflections from radar signals transmitted from a plurality of transmission antennas associated with the plurality of reception antennas, and converting the plurality of radar signals to a plurality of digitized radar signals at the plurality of ADCs.

\* \* \* \* \*